United States Patent [19]

Umeda et al.

[11] Patent Number: 4,585,431
[45] Date of Patent: Apr. 29, 1986

[54] SPROCKET ASSEMBLY FOR A TRACK TYPE VEHICLE

[75] Inventors: Haruhiko Umeda, Yokohama; Nobuo Fujita, Uji; Keiji Bando; Kazuyuki Onohara, both of Kyoto; Yasuo Fujiwara, Yawata, all of Japan

[73] Assignee: Kabushiki Kaisha Komatsu Seisakusho, Japan

[21] Appl. No.: 637,196

[22] Filed: Aug. 3, 1984

[30] Foreign Application Priority Data

Aug. 4, 1983 [JP] Japan .................. 58-141855

[51] Int. Cl.⁴ .................. F16D 3/00; F16H 55/14
[52] U.S. Cl. .................. 474/94; 474/161; 474/901
[58] Field of Search .................. 474/94, 901, 161; 305/57, 21; 180/9.62; 464/70, 85

[56] References Cited

U.S. PATENT DOCUMENTS

| | | | |
|---|---|---|---|
| 2,113,018 | 4/1938 | Fergusson | 305/57 X |
| 2,752,766 | 7/1956 | Wildhaber | 464/70 |
| 3,257,860 | 6/1966 | Runde et al. | 474/94 |
| 4,261,214 | 4/1981 | Watanabe et al. | 474/161 X |
| 4,332,573 | 6/1982 | Uchida et al. | 474/161 X |

FOREIGN PATENT DOCUMENTS 142159 6/1980 Japan .................. 474/161

Primary Examiner—Stuart S. Levy
Assistant Examiner—Katherine Matecki
Attorney, Agent, or Firm—Armstrong, Nikaido, Marmelstein & Kubovcik

[57] ABSTRACT

A sprocket assembly is disclosed for use as a drive or idler wheel for the endless tracks of a track type vehicle. Included is an inner rim rigidly and concentrically mounted to a hub and having a series of studs projecting radially outwardly therefrom at constant circumferential spacings. Each stud has fitted thereon a universal shock absorber having two or more concentric tubes of rigid material with a preloaded elastic member or members engaged therebetween. Disposed concentrically outwardly of the studded inner rim is an outer rim having a series of sprocket teeth formed on its circumference and defining an annular row of radial, inwardly open cavities to closely receive the respective shock absorbers on the studs of the inner rim. The shock absorbers damp the forces exerted between the inner and outer rims in all of the axial, radial, and rotational directions of the sprocket assembly. Preferably, a pair of annular end covers are rigidly mounted to the inner rim and are held against the opposite axial ends of the outer rim via elastic sealing members which are also effective to elastically bear the forces exerted between the inner and outer rims in the axial, radial, and rotational directions of the sprocket assembly.

3 Claims, 5 Drawing Figures

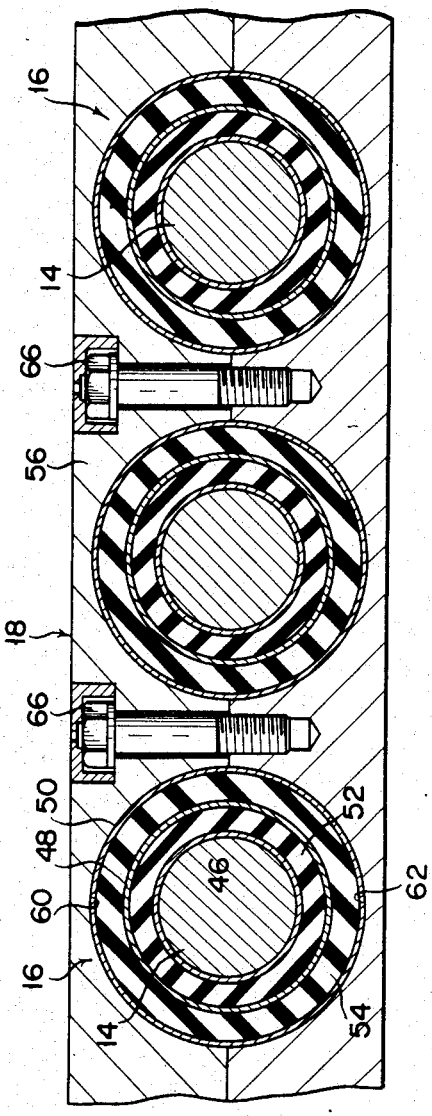
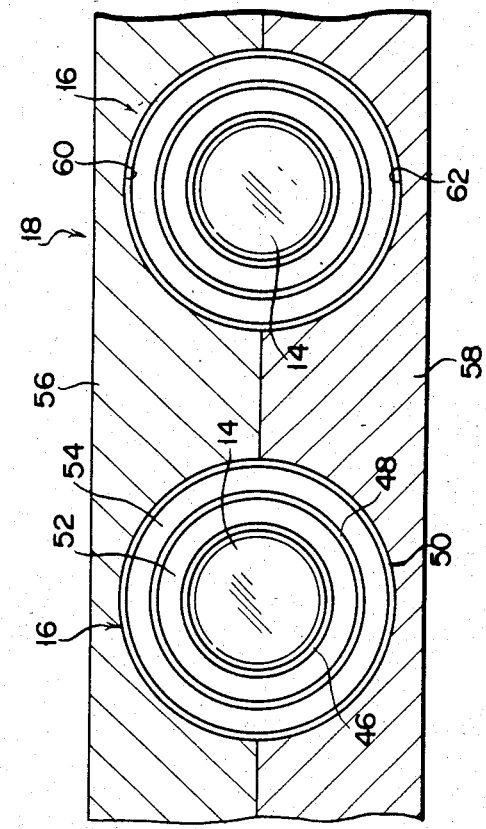

SPROCKET ASSEMBLY FOR A TRACK TYPE VEHICLE

BACKGROUND OF THE INVENTION

Our invention relates to a sprocket assembly for use as either a drive or idler wheel for the tracks or endless chain belts of a track type vehicle. Our invention is directed more specifically to such a sprocket assembly capable of damping the forces exerted thereon in all of the axial, radial, and rotational directions of the sprocket assembly.

Sprocket assemblies of the type under consideration usually comprise an inner rim mounted in a fixed relation to the hub, and an outer rim disposed concentrically outwardly of the inner rim and having a series of sprocket teeth for engagement with the track assembly of the vehicle. A variety of devices have been suggested and used to provide more or less elastic connections between the inner and outer rims of the sprocket assemblies. One known arrangement includes torque pins mounted between the inner and outer rims via elastic members, such that the elastic members bear radial loads. However, the inner and outer rims make metal to metal contact via the torque pins when loaded in both axial and rotational directions of the sprocket assembly. Consequently the torque pins and other parts making direct contact therewith have been susceptible to rapid wear.

Another conventional device has rubber pads interposed between radial teeth on the inner and outer rims for elastically bearing loads in both radial and rotational directions. Here again, however, metal to metal contact has been resorted to for bearing the relative axial thrust of the inner and outer rims. As an additional drawback the rubber pads are of such construction that they cannot possibly be preloaded prior to the assemblage of the sprocket assembly. They have had to be preloaded in place between the inner and outer rims, which fact has made the assemblage of the sprocket assembly very difficult. The pads have also been liable to be preloaded to different degrees depending upon the dimensional accuracies of the related parts.

SUMMARY OF THE INVENTION

We have found solutions to the noted problems of the prior art and hereby provide an improved sprocket assembly which has no metal to metal contact between the inner and outer rims, yielding numerous advantages over the prior art as set forth subsequently.

Stated briefly, the sprocket assembly of our invention comprises an inner rim concentrically and rigidly mounted to a hub and having a series of studs formed at circumferential spacings thereon so as to project radially outwardly therefrom. Each stud has concentrically mounted thereon a universal shock absorber of generally elastic material in the shape of a hollow cylinder. Also included is an outer rim disposed concentrically outwardly of the inner rim and having defined therein a series of radial cavities adapted to closely receive the respective shock absorbers on the studs of the inner rim. The outer rim has a series of sprocket teeth formed circumferentially thereon for engagement with a track assembly of the vehicle.

It is to be appreciated that the inner and outer rims interengage solely via the universal shock absorbers. Each shock absorber typically comprises two or more concentric tubes of rigid material having a tubular body or bodies of elastic material engaged therebetween. We call these shock absorbers "universal" because they can take the forces exerted between the inner and outer rims in all of the radial, axial, and rotational directions of the sprocket assembly. The inner and outer rims have no metal to metal contact therebetween and so require no lubrication. Further the shock absorbers of the above construction can be preloaded individually before they are mounted in place between the inner and outer rims. The assemblage of the sprocket assembly is therefore much easier than that of the comparable prior art. The degree to which the shock absorbers are preloaded are also substantially unaffected by the dimensional accuracies of the inner and outer rims.

The ease of assemblage is further enhanced by the fact that the outer rim is split into two sections along a plane normal to the axis of the sprocket assembly. The two outer rim sections can be screwed or otherwise fastened together in place on the inner rim after fitting the shock absorbers over the studs of the inner rim.

According to a further feature of our invention a pair of end covers are secured to the opposite axial ends of the inner rim and held against the opposite axial ends of the outer rim via a pair of annular seals of elastic material, respectively. These seals can also elastically bear the forces acting between the inner and outer seals in all of the axial, radial, and rotational directions. The seals offer the additional advantage of greatly reducing the number of component parts of the sprocket assembly.

All in all, the sprocket assembly of our invention has improved durability and contributes greatly to the riding comfort of the track type vehicle.

The above and other features and advantages of our invention and the manner of realizing them will become more apparent, and the invention itself will best be understood, from a study of the following description and appended claims, with reference had to the attached drawings showing a preferred embodiment of our invention.

BRIEF DESCRIPTION OF THE DRAWINGS

FIG. 4 is an enlarged, fragmentary section taken along the line IV—IV of FIG. 2 and showing in particular some of the universal shock absorbers mounted between the inner and outer rims of the sprocket assembly to provide elastic connections therebetween; and FIG. 5 is an enlarged fragmentary section taken along the line V—V of FIG. 2 and also showing in particular some of the universal shock absorbers.

DESCRIPTION OF THE PREFERRED EMBODIMENT

Figure 1:
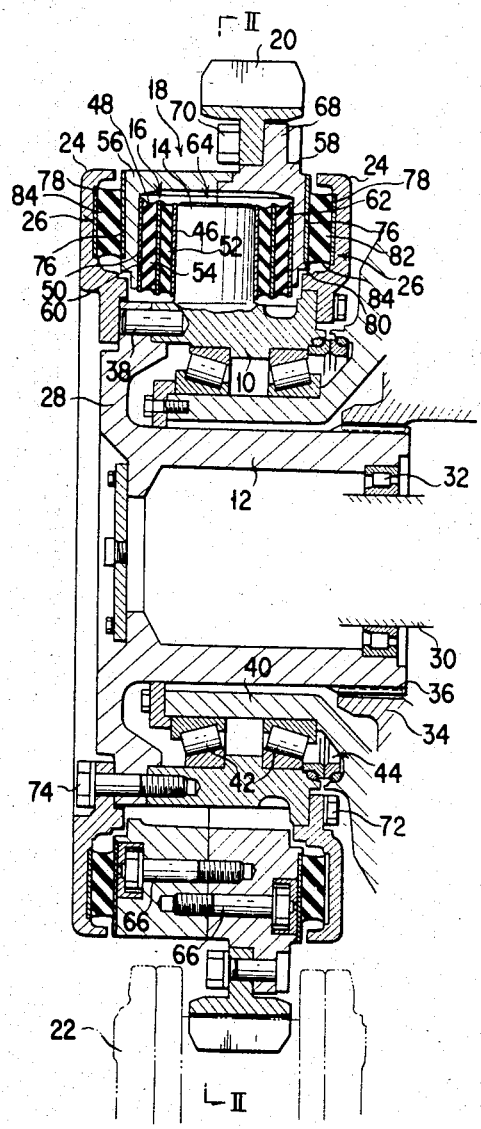
FIG. 1 is an axial section through the sprocket assembly constructed in accordance with the invention, the sprocket assembly being herein shown adapted for use as a drive wheel for a track of a track type vehicle.
Figure 2:
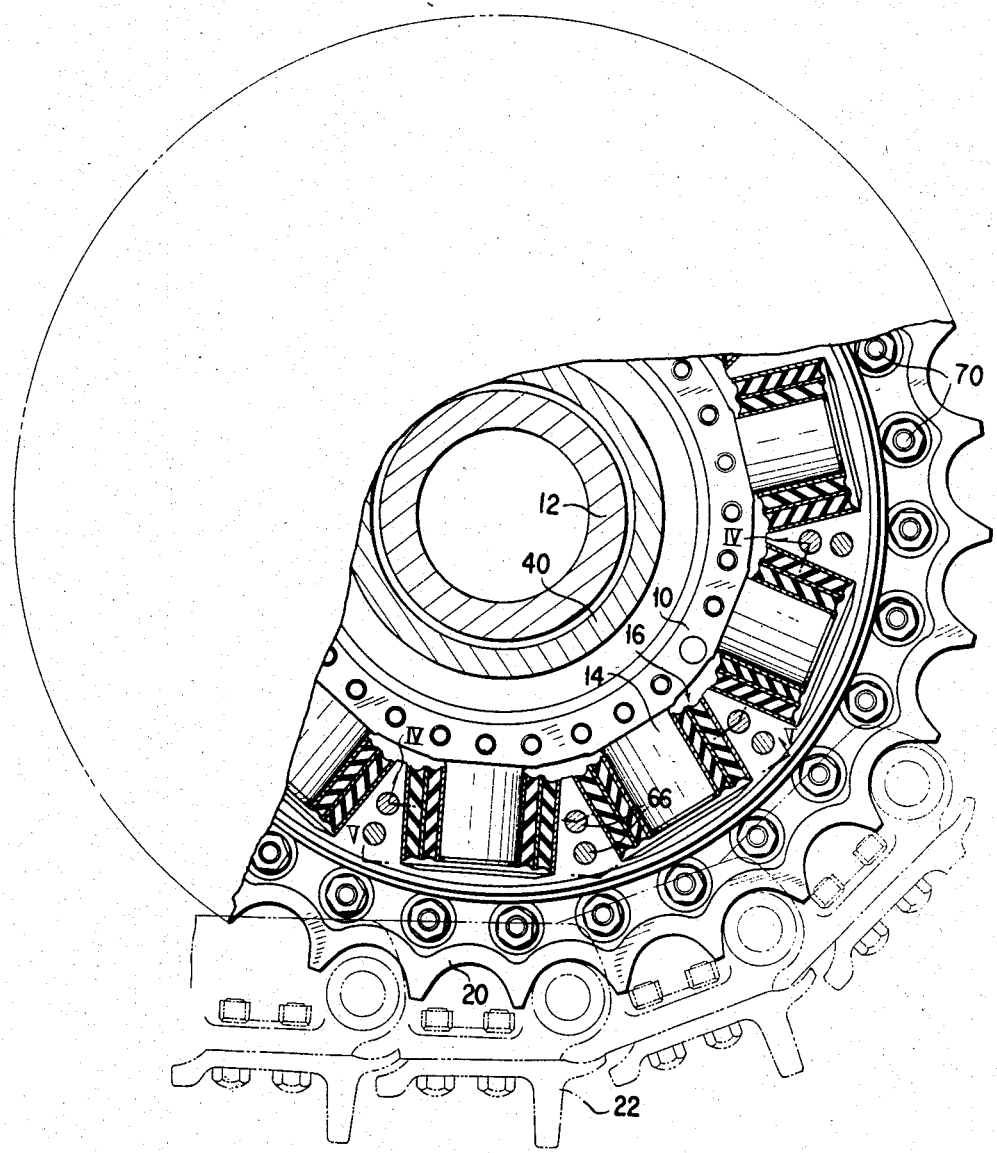
FIG. 2 is a section through the sprocket assembly, taken along the line II—II of FIG. 1, the sprocket assembly being shown fragmentarily for illustrative convenience.
Figure 3:
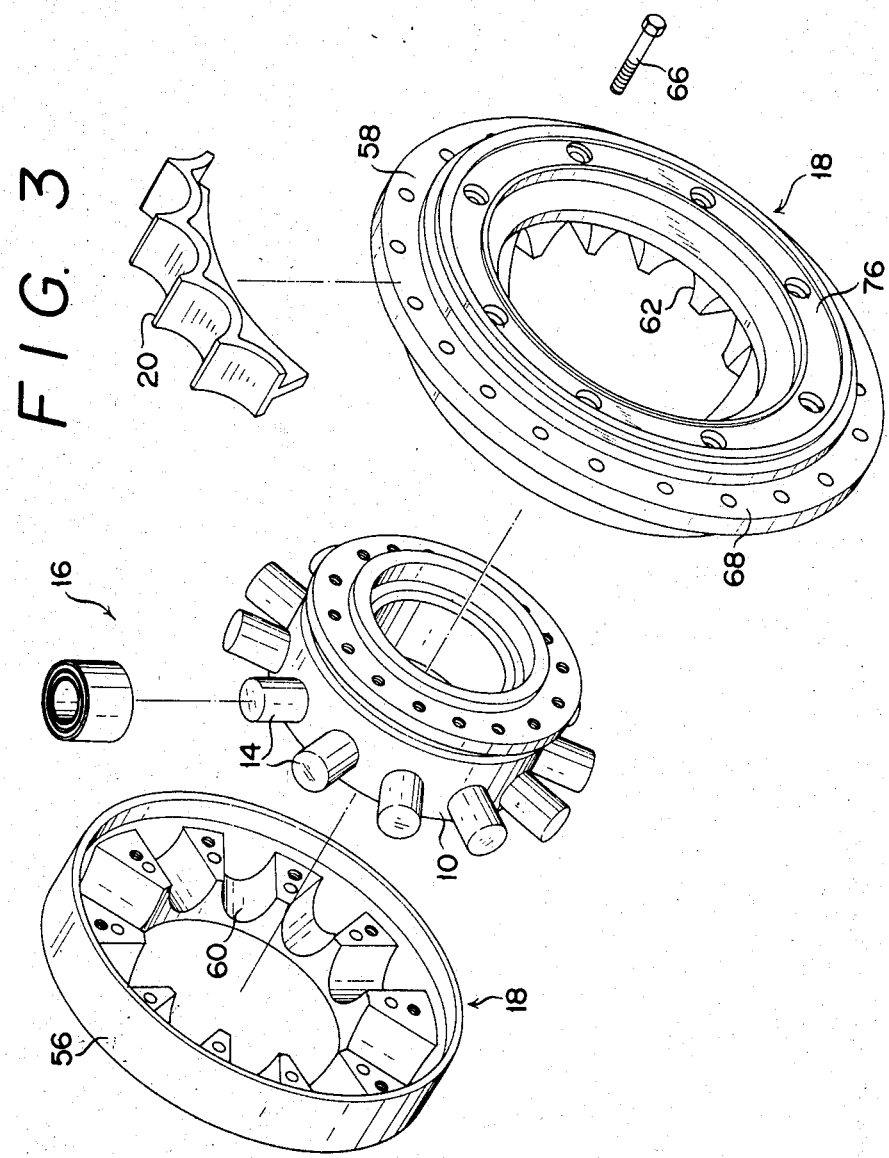
FIG. 3 is an exploded perspective view of the sprocket assembly, the view not showing the end covers and some other components of the sprocket assembly for illustrative convenience.

We will first refer to FIGS. 1 through 3 in order to briefly explain the general organization of the sprocket assembly of our invention, which is herein shown as a drive wheel. The illustrated sprocket assembly broadly comprises:

1. An inner rim 10 rigidly mounted to a hub 12 concentrically outwardly thereof.

2. A series of studs 14 formed on the inner rim 10 at constant circumferential spacings and projecting radially outwardly therefrom.

3. A plurality of universal shock absorbers 16 mounted one over each stud 14 of the inner rim 10.

4. A split outer rim 18 disposed concentrically outwardly of the inner rim 10 and engaged with the studs 14 via the shock absorbers 16.

5. A series of sprocket teeth 20 mounted circumferentially on the outer rim 18 for engagement with a track assembly 22 of the vehicle.

6. A pair of annular end covers 24 rigidly fastened to the opposite axial ends of the inner rim 10 and held opposite the axial ends of the outer rim 18 with gaps therebetween.

7. A pair of seals 26 sealing the gaps between outer rim 18 and end covers 24.

As best seen in FIG. 1, the hub 12 carrying the inner rim 10 takes the form of a hollow cylinder, complete with a flange 28, and is rotatably mounted on an axle 30 via bearing means such as shown at 32. A final drive element 34 makes splined engagement at 36 with the hub 12 for imparting rotation thereto and thence to the entire sprocket assembly. The flange 28 of the hub 12 is pinned at 38 to the inner rim 10. This inner rim is further rotatably mounted on a hollow support structure 40, which is in a fixed relation to the vehicle frame, not shown, via a pair of bearings 42. At 44 are shown floating seals between inner rim 10 and support structure 40.

Reference is directed also to FIGS. 4 and 5 in order to describe the construction of the universal shock absorbers 16 fitted over the studs 14 of the inner rim 10 and engaged in the outer rim 18. Each shock absorber 16 is shown to comprise three concentric tubes 46, 48 and 50, which are all of metal or like rigid material, and two tubular members 52 and 54 of rubber or like elastic material interposed between the rigid tubes. The elastic member 52 is firmly engaged between inner tube 46 and intermediate tube 48, and the other elastic member 54 between intermediate tube 48 and outer tube 50. The inner tube 46 has its inside diameter so determined as to fit over one of the studs 14 of the inner rim 10. It will be appreciated that the two elastic members 52 and 54 of each shock absorber 16 can be easily preloaded to a desired degree in the manufacture or assemblage of the shock absorber.

Notwithstanding the showing of the drawings we do not wish the shock absorbers 16 to be limited to this particular construction. Each shock absorber may in its simplest form comprise only two concentric tubes of rigid material with an elastic member engaged therebetween.

As will be seen from both FIGS. 1 and 3, the outer rim 18 is split, for the ease of assemblage, into two sections 56 and 58 along a plane normal to the axis of the sprocket assembly, optimumly passing the axis of the studs 14 of the inner rim 10. FIG. 3 best illustrates that the two outer rim sections 56 and 58 have defined therein series of semicylindrical recesses 60 and 62, respectively, arranged radially. When the outer rim sections are combined, the semicylindrical recesses 60 and 62 form cylindrical cavities, designated 64 in FIG. 1, of radial arrangement opening radially inwardly. These cavities 64 are sized and arranged to closely receive the respective shock absorbers 16 on the studs 14 of the inner rim 10. Receiving the shock absorbers 16 in the cavities 64, the two outer rim sections 56 and 58 are fastened to each other by screws 66 arranged alternately with the shock absorbers, as will be apparent from a consideration of FIGS. 1, 2 and 4. It is thus seen that the inner 10 and outer 18 rims make positive engagement with each other via the shock absorbers 16, with no metal to metal contact therebetween.

The right hand section 58, as seen in FIGS. 1 and 3, of the outer rim 18 has a flange 68 formed circumferentially thereon. The sprocket teeth 20 are mounted to this flange 68 by bolts 70 for engagement with the vehicle track assembly 22.

With reference to FIG. 1 the pair of annular end covers 24 have their inner marginal edge portions fastened to the opposite axial ends of the inner rim 10 by screws 72 and 74 respectively. The screws 72 secure the right hand end cover 24 directly to the inner rim 10 whereas the screws 74 secure the left hand end cover 24 to the inner rim via the flange 28 of the hub 12. Thus the screws 74 serve the additional purpose of rigidly mounting the inner rim 10 to the hub flange 28 in coaction with the aforementioned pins 38.

The pair of seals 26 close the gaps between the opposite axial ends of the outer rim 18 and the pair of end covers 24. For mounting these seals the outer rim 18 have seal seats 76 formed in their ends, and the end covers 24 also have seal seats 78 formed in their surfaces opposed to the outer rim. Each seal 26 comprises a pair of annular holder plates 80 and 82 and an annular member 84 of rubber or like elastic material interposed therebetween. The holder plates 80 are held against the seal seats 76 on the outer rim 18 whereas the holder plates 82 are held against the seal seats 78 on the end covers 24. The total thickness of each seal 26 before being mounted in position on the sprocket assembly is greater than the spacing between each opposed pair of seal seats 76 and 78. Consequently, on being screwed to the inner rim 10, the end covers 24 serve to apply precompression to the elastic members 84 of the seals 26.

It will be seen that the seals 26 are well calculated not to impair the desired elastic connection between inner 10 and outer 18 rims; rather, the seals 26 with their elastic members 84 coact with the shock absorbers 16 to cushion the impulsive forces acting in various directions between the inner and outer rims. Axial thrusts between the rims cause compression of the elastic members 84, and radial and rotational forces between the rims act as shearing stresses on the elastic members.

In operation, as the final drive element 34 imparts rotation to the hub 12 via the splined connection 36, the inner drum 10 rotates therewith as it is rigidly connected to the flange 28 of the hub by the pins 38 and screws 74. The rotation of the inner drum 10 is in turn transmimitted to the outer drum 18 via the inner drum studs 14 and universal shock absorbers 16. The sprocket teeth 20 rotate with the outer drum 18 to drive the track assembly 22 and hence to propel the vehicle. Any forces that may develop between the inner 10 and outer 18 rims during the travel of the vehicle, in all of the axial, radial, and rotational directions of the sprocket assembly, are absorbed by, or transmitted through, the shock absorbers 16 as well as the seals 26.

The illustrated sprocket assembly is designed with a due regard to the ease of assemblage. After mounting the inner rim 10 to the hub flange 28, and before mounting the end covers 24, the preloaded shock absorbers 16 are fitted over the studs 14 of the inner rim. Then the split outer rim 18 is mounted in position, so as to receive the shock absorbers 16 in its cavities 64, by screwing its constituent sections 56 and 58 to each other. Then the pair of end covers 24 are screwed to the inner drum 10, with the seals 26 engaged between the end covers and the outer rim 18.

Although we have shown and described the sprocket assembly of our invention as adapted for use as a drive wheel, we recognize that the inventive concepts are applicable to an idler wheel as well. Further, since a variety of modifications or alterations of the illustrated embodiment will readily occur to one skilled in the art, we do not wish our invention to be limited to the details of this diclosure except as specifically set forth in the following claims.

We claim:

1. A sprocket assembly for a track type vehicle, comprising:
   (a) a hub;
   (b) an inner rim concentrically mounted to the hub for joint rotation therewith;
   (c) a series of cylindrical studs rigidly formed on the inner rim at circumferential spacings and projecting radially outwardly therefrom;
   (d) a plurality of universal shock absorbers each in the shape of a hollow cylinder, the shock absorbers being concentrically fitted one over each stud on the inner rim;
   (e) an outer rim disposed concentrically outwardly of the inner rim and having defined therein a series of radial cavities which closely receive the respective shock absorbers fitted over the studs on the inner rim, the shock absorbers elastically bearing the forces exerted between the inner and outer rims in all of the radial, axial, and rotational directions of the sprocket assembly, said outer rim being split into two sections along a plane normal to the axis of the sprocket assembly, the two sections being rigidly fastened together;
   (f) a series of sprocket teeth formed circumferentially on the outer rim;
   (g) a pair of annular end covers secured to the opposite axial ends of the inner rim and disposed on the opposite sides of the outer rim with gaps therebetween;
   (h) a pair of annular seals of elastic material sealing the gaps between the outer rim and the end covers, the seals elastically bearing the forces exerted between the outer rim and the end covers in all of the radial, axial, and rotational directions of the sprocket assembly; and
   (i) said pair of end covers being fastened to the inner rim so as to apply precompression to the annular seals.

2. A sprocket assembly as set forth in claim 1, wherein each universal shock absorber comprises:
   (a) an inner tube of rigid material fitted directly over one of the studs on the inner rim;
   (b) an outer tube of rigid material concentrically surrounding the inner tube; and
   (c) a tubular member of elastic material engaged between the inner and outer tubes.

3. A sprocket assembly as set forth in claim 1, wherein each universal shock absorber comprises:
   (a) an inner tube of rigid material fitted directly over one of the studs on the inner rim;
   (b) an intermediate tube of rigid material concentrically surrounding the inner tube;
   (c) a first tubular member of elastic material engaged between the inner and intermediate tubes;
   (d) an outer tube of rigid material concentrically surrounding the intermediate tube; and
   (e) a second tubular member of elastic material engaged between the intermediate and outer tubes.

* * * * *